March 18, 1930. H. R. FLOOD 1,751,197
ADVERTISING DEVICE
Filed Dec. 19, 1928

INVENTOR
Henry Richard Flood
BY
C. Barnard Burdon
ATTORNEY

Patented Mar. 18, 1930

1,751,197

UNITED STATES PATENT OFFICE

HENRY RICHARD FLOOD, OF SOUTH CHINGFORD, ENGLAND, ASSIGNOR TO CECIL GORDON VOKES, OF LONDON, ENGLAND

ADVERTISING DEVICE

Application filed December 19, 1928, Serial No. 327,096, and in Great Britain December 20, 1927.

This invention relates to advertising devices and has special reference to devices of the kind known as "daylight" reflecting signs in which daylight passes through a transparency either before or after reflection towards the observer.

An object of the present invention is to provide such a sign with means to display more than one transparency in turn, so as to give a changing legend or the like.

A further object is to provide improved means whereby a plurality of legends may be brought into operation in such devices by means of an oscillatory movement of a carrier whereby the transparencies are supported.

Other objects and advantages will be understood as this description proceeds, and will be appreciated from the more specific description of the invention and from the claims.

A device made according to the present invention is provided with two or more surfaces or sign elements carrying advertising matter, each of said surfaces being adapted to be displayed in turn. The said surfaces may, for example, be mounted in a casing, and may be oscillated in the casing for the purpose of displaying each surface in turn. Mechanical or electrical means may be provided for oscillating the said sign elements, or they may be oscillated by hand.

A preferred form is shown upon the accompanying drawings wherein:—

Referring to the drawings:—

Figure 1:
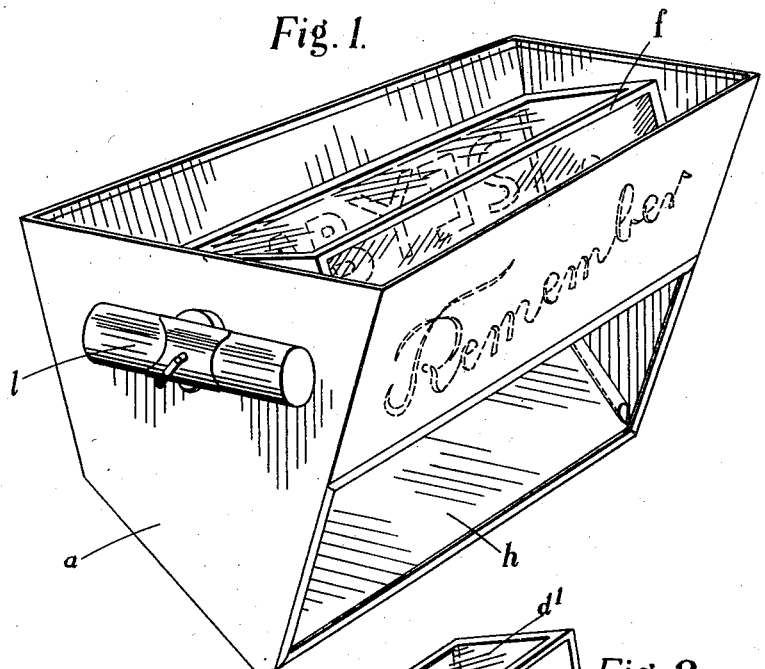
Fig. 1 is a schematic perspective view of the device.
Figure 2:
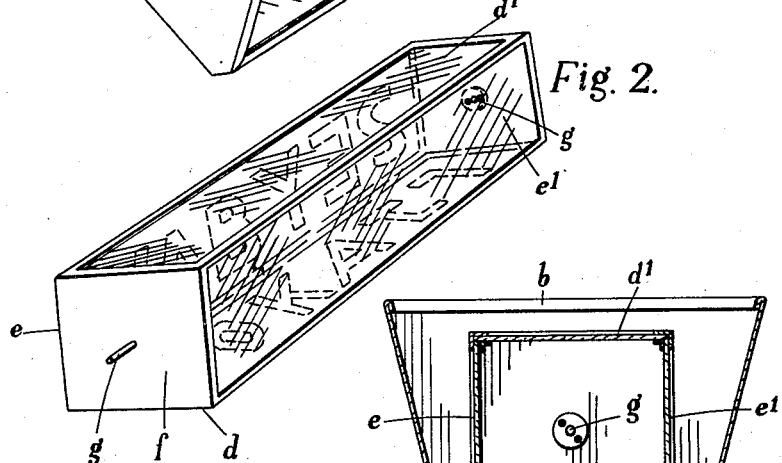
Fig. 2 is a perspective view of the frame carrying the transparencies.
Figure 3:
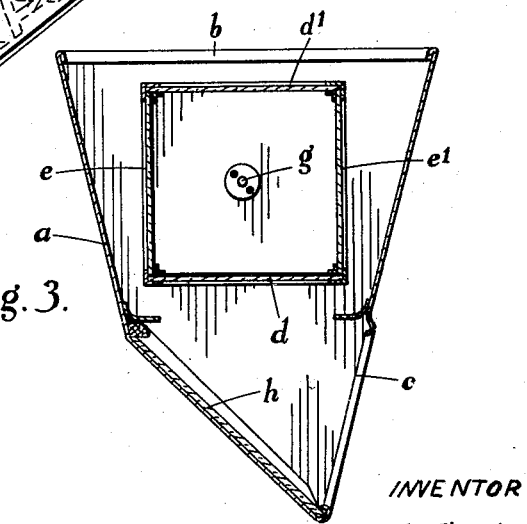
Fig. 3 is a transverse section of the device.

The casing $a$ having two open sides $b$ and $c$ is adapted to be fixed in position on the top of a motor vehicle. The advertising matter to be displayed is carried on two surfaces $d$, $e$ of sign elements carried on a frame $f$, provided at each end with central trunnions or pivot bearings $g$, by means of which the said frame is mounted inside the casing $a$, the trunnions $g$ passing through holes in the ends of the casing. A mirror or other reflecting surface $h$ is arranged within the casing $a$, underneath the frame $f$, and the arrangement is such that light passes into the casing through the open side $b$, passes through the elements of the sign on one of the surfaces $d$ or $e$, and is reflected from the mirror through the open side $c$ of the casing.

It is to be observed that the casing is formed to give an unobstructed passage for the light upon the sides $d^1$ and $e^1$ opposite to $d$ and $e$, these sides as shown being formed of clear glass. This is an important feature in facilitating the use of changing transparencies in a daylight reflecting sign since it is clearly impossible to situate the source of light at the centre of a revolving or oscillating frame as is the common practice where an artificial source is employed.

Means are provided for oscillating the frame $f$ so that the advertising matter contained on the surfaces $d$ and $e$ is alternately displayed through the opening $c$. A suitable means for this purpose is contained in the cylinder casing $l$, secured to one end of the casing $a$. These means do not per se form any part of the present invention and are therefore not described in detail being well-known in connection with the operation of windscreen wipers.

In the form illustrated the mechanism of a common form of suction operated windscreen wiper is operatively connected to the trunnion $g$, whereby the frame $f$ is oscillated to the desired extent. The device is operated in the known manner by a flexible tube connected at one end to the induction pipe of the engine, and at the other end to the cylinder casing $l$ in the known way. Alternatively the frame may be operated electrically, for example, by electric windscreen wiper mechanism; or mechanically.

A device made according to the present invention may be carried in a motor road vehicle, or it may be displayed in a shop window or in any other fixed position. The device may be operated by any convenient known mechanism for producing an oscillatory movement.

The advertising surfaces may be prepared in any known way. They may, for example, comprise stencils laid on coloured glass, or coloured paper may be laid on stencils, or they may be otherwise suitably prepared. Further, different colours may be given to the matter displayed by suitably arranging the surfaces carrying the advertising matter.

I claim:—

1. A daylight reflecting advertising device comprising a casing, an inclined mirror in said casing arranged to reflect daylight to an observer, a plurality of transparencies, a pivoted casing carrying said transparencies, and means to oscillate said casing so as to bring said transparencies into operative position one at a time.

2. In a daylight reflecting sign, a pivoted holder, a plurality of transparencies carried by said holder at an angle to one another, and a plurality of translucent plates carried by said holder each opposite to a transparency.

3. In a daylight reflecting sign, a pivoted holder, and a plurality of transparencies carried by said holder at an angle to one another, said holder being translucent opposite to each of said transparencies.

In testimony whereof I affix my signature.

HENRY RICHARD FLOOD.